United States Patent
Wang (10) Patent No.: US 7,528,894 B2
(45) Date of Patent: May 5, 2009

(54) LCD HAVING STORAGE CAPACITOR ELECTRODES WITH WIDER PORTIONS LOCATED WITHIN TRIANGULAR AREAS OF PIXEL REGIONS AND WITH SPACERS DISPOSED IN REGIONS CORRESPONDING TO THE TRIANGULAR AREAS TO MITIGATE DARK-STATE LIGHT LEAKAGE

(75) Inventor: Chungyi Wang, Kaohsiung (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 260 days.

(21) Appl. No.: 11/057,746

(22) Filed: Feb. 14, 2005

(65) Prior Publication Data

US 2005/0190313 A1     Sep. 1, 2005

(30) Foreign Application Priority Data

Feb. 24, 2004     (TW)     ............................... 93104658 A (51) Int. Cl.
  *G02F 1/1343*     (2006.01)
(52) U.S. Cl. ........................... 349/38; 349/39; 349/130; 349/146
(58) Field of Classification Search .................. 349/38, 349/39, 128–130, 146
  See application file for complete search history.

(56) References Cited

U.S. PATENT DOCUMENTS 6,211,937 B1 * 4/2001 Miyachi et al. ............. 349/156
6,671,020 B2 * 12/2003 Kim et al. ................... 349/129
2002/0159018 A1 * 10/2002 Kataoka et al. ............. 349/143
2003/0206262 A1   11/2003 Kim et al.
2004/0075798 A1    4/2004 Inoue et al.
2004/0095538 A1    5/2004 Kim et al.
2005/0046779 A1 *  3/2005 Sumi et al. ................. 349/155

FOREIGN PATENT DOCUMENTS

TW     493101     7/2002
TW     591277     6/2004

OTHER PUBLICATIONS

Office Action received from European Patent Office dated Jan. 8, 2007.

* cited by examiner

*Primary Examiner*—David Nelms
*Assistant Examiner*—John Heyman
(74) *Attorney, Agent, or Firm*—Thomas, Kayden, Horstemeyer & Risley (57) ABSTRACT

Embodiments of a liquid crystal display having a specifically designed storage capacitor are disclosed. One embodiment of the liquid crystal display includes a liquid crystal layer sandwiched between two substrates and a plurality of pixel regions each divided into a plurality of areas by a regulating structure provided on at least one of the two substrates for regulating orientation of the liquid crystal layer. The storage capacitor includes a first capacitor electrode in each pixel region. The first capacitor electrode has a main body and at least a portion extending from one side of the main body, wherein the extending portion is positioned in a darker area of the pixel region in a light transmissive state. Other embodiments are also included.

39 Claims, 7 Drawing Sheets

LCD HAVING STORAGE CAPACITOR ELECTRODES WITH WIDER PORTIONS LOCATED WITHIN TRIANGULAR AREAS OF PIXEL REGIONS AND WITH SPACERS DISPOSED IN REGIONS CORRESPONDING TO THE TRIANGULAR AREAS TO MITIGATE DARK-STATE LIGHT LEAKAGE

BACKGROUND

1. Field of the Invention

The present disclosure relates to capacitors for liquid crystal display and, more particularly, to a storage capacitor for a multi-domain vertically aligned liquid crystal display.

2. Description of the Related Art

Liquid crystal display (LCD) mainly comprises a liquid crystal display cell having two glass substrates oppositely positioned and a liquid crystal layer interposed therebetween. Vertically-aligned (VA) LCD is a mode using a liquid crystal material having a negative dielectric anisotropy and vertical alignment films. When no voltage is applied, liquid crystal molecules are aligned in a vertical direction and a black display appears. When a predetermined voltage is applied, the liquid crystal molecules are aligned in a horizontal direction and a white display appears. Compared to the twisted nematic (TN) LCD, the vertically-aligned (VA) LCD provides higher contrast, higher response speed, and excellent viewing angle.

However, the VA LCDs still suffer from the problems of decreased contrast ratio and contrast reversal when viewed in a direction not perpendicular to the display area. As a result of the interaction between light and the liquid crystal molecules, light passing through the cell in a vertical incident angle interact with the liquid crystal molecules in a way different from light passing through the cell in a non-vertical incident angle. The contrast ratio between a light transmissive state (white) and a non-transmissive state (black) decreases drastically at an angle not perpendicular to the display, thereby making it less desirable in many applications, such as flat panel television screens and large computer screens.

It is known that viewing angle performance of a VA LCD can be improved by setting the orientation of the liquid crystal molecules inside pixels to a plurality of mutually different directions. European Patent Publication Number 0884626-A2 discloses a multi-domain VA LCD having domain regulating means for regulating the orientation of a liquid crystal in which liquid crystal molecules are aligned obliquely when a voltage is applied so that the orientation will include a plurality of directions within each pixel region.

Typically, the VA LCD described above is a thin film transistor (TFT) LCD mainly comprising a color filter (CF) substrate and a TFT substrate. The CF substrate is typically provided with a plurality of color filters and a common electrode. The TFT substrate is typically provided with a plurality of gate lines formed in parallel to one another, a plurality of data lines, vertically to the gate lines, formed in parallel to one another, and TFTs and pixel electrodes. Usually, spacers are formed between the substrates for defining the gap between the substrates.

The LCD described above is typically provided with a storage capacitor (Cs) to maintain voltage at the pixel electrode within specified limits for a predetermined amount of time after the TFT has been turned off. The storage capacitor is formed of an opaque metal, and therefore the area occupied by the storage capacitor cannot be used as a display area thereby reducing the display luminance. However, it is desirable to have a large Cs to improve image quality. Therefore, a balance must be achieved between the display luminance and Cs size.

SUMMARY

The present disclosure provides for a multi-domain vertically aligned (MVA) LCD having a specifically designed storage capacitor for significantly increasing the overall luminance of the LCD and providing a predetermined capacitance.

To achieve the above listed and other objects, the multi-domain MVA LCD according to one embodiment of the present disclosure mainly comprises a liquid crystal layer sandwiched between two substrates and a regulating structure provided on at least one of the two substrates for regulating orientation of the liquid crystal layer such that the liquid crystal molecules are aligned obliquely when a voltage is applied so that the orientation will include a plurality of directions. The storage capacitor according to one embodiment of the present disclosure mainly includes a first capacitor electrode, a second capacitor electrode and an interconnecting portion in each pixel region for forming a storage capacitor together with the pixel electrode. The first capacitor electrode and the second capacitor electrode respectively have a main body and at least one extending portion (that may also be named "wing portion") extending from one side of the main body.

To achieve the above listed and other objects, the extending portion of the second capacitor electrode is formed at a location facing an area of the pixel region defined by the regulating structure and an edge of the pixel electrode adjacent to the regulating structure, wherein the angle included between the regulating structure and the edge of the pixel electrode is less than 90 degrees. The main body of the second capacitor electrode extends outwardly from the area in a first direction and the extending portion extends in a second direction not parallel to the first direction. Since the extending portion of the capacitor electrode can provide an extra capacitive area, the capacitor electrode can be designed in such a way that the total area of the other portion of the capacitor electrode in other areas of the pixel region is decreased while still providing a predetermined capacitance.

It should be understood that the extending portion of the first capacitor electrode substantially has a triangular contour or a trapezoid contour. The extending portion of the first capacitor electrode has at least one edge situated at an angle of 135 degrees to the main body of the second capacitor electrode. Moreover, the extending portion of the first capacitor electrode may be a branch situated at an angle of 135 degrees to the main body of the second capacitor electrode.

The interconnecting portion mentioned above is used for electrically coupling the second capacitor electrode and the pixel electrode such that the second capacitor electrode and the pixel electrode together functions as a counter electrode to the first capacitor electrode. The interconnecting portion is preferably disposed within a region defined by the extending portion of the first capacitor electrode and the main body of the second capacitor electrode adjacent to the extending portion.

The MVA LCD for use with the present disclosure may be a thin film transistor (TFT) LCD mainly comprising a plurality of parallel gate lines and a plurality of parallel data lines perpendicular to the gate lines, wherein each of the pixel regions is defined by two adjacent gate lines and two adjacent data lines.

The regulating structure mentioned above may comprise an array of protrusions and slits wherein the protrusions are arranged substantially in a zigzag pattern and in parallel to one another, and the slits and the protrusions are arranged alternately. In each of the pixel regions, one of the protrusions has a bending portion. In one embodiment of the present disclosure, each of the pixel regions is divided into a plurality of areas by the protrusions and the slits, and the area defined between the bending portion and the data line adjacent to the bending portion is darker than other areas in a light transmissive state. Therefore, in this embodiment, the extending portion of the first capacitor electrode is substantially formed between the bending portion and the data line adjacent to the bending portion.

BRIEF DESCRIPTION OF THE DRAWINGS

These and other features, aspects, and advantages of the present disclosure will be more fully understood by reading the following detailed description of the preferred embodiment, with reference made to the accompanying drawings as follows.

DETAILED DESCRIPTION OF THE PREFERRED EMBODIMENT

The present disclosure provide a multi-domain vertically aligned (MVA) LCD having a specifically designed storage capacitor. The LCD for use with the present disclosure mainly comprises a liquid crystal layer sandwiched between a first substrate and a second substrate and a regulating structure provided on at least one of the two substrates. The substrates are processed for vertical alignment, e.g., by using a vertical alignment film, such that the liquid crystal molecules in the liquid crystal layer are aligned in a direction generally perpendicular to the processed surface of the substrates when no substantial electric field is applied to the liquid crystal layer. The liquid crystal layer has a negative dielectric anisotropy. The regulating structures regulate orientation of the liquid crystal layer such that the liquid crystal molecules are aligned obliquely when a voltage is applied so that the orientation will include a plurality of directions within each pixel region thereby improving viewing angle performance. Each of the pixel regions is divided into a plurality of areas by the regulating structures. For a normally black LCD, some of the areas are darker than other areas in a light transmissive state. The reason is described below.

In the area where the angle included between the regulating structure provided on the first substrate and a pixel electrode provided on the second substrate is less than 90 degrees, the liquid crystal molecules are tilted in different directions such that they collide with each other, which, in turn, results in irregular arrangement of the liquid crystal molecules thereby adversely affecting the luminance of the LCD. The irregularly arranged liquid crystal molecules can cause light leakage when no voltage is applied and decrease the luminance when a voltage is applied forming a darker area, therefore, a darker area is formed. The storage capacitor according to the present disclosure mainly includes a first capacitor electrode in each pixel region for forming a storage capacitor unit together with the pixel electrode. The first capacitor electrode has a main body and at least one extending portion (that may also be named "wing portion") extending from one side of the main body. In order to increase the overall luminance of the LCD and provide a predetermined storage capacitance, the extending portion of the second capacitor electrode is formed in the darker area of the pixel region in a light transmissive state.

Figure 6:
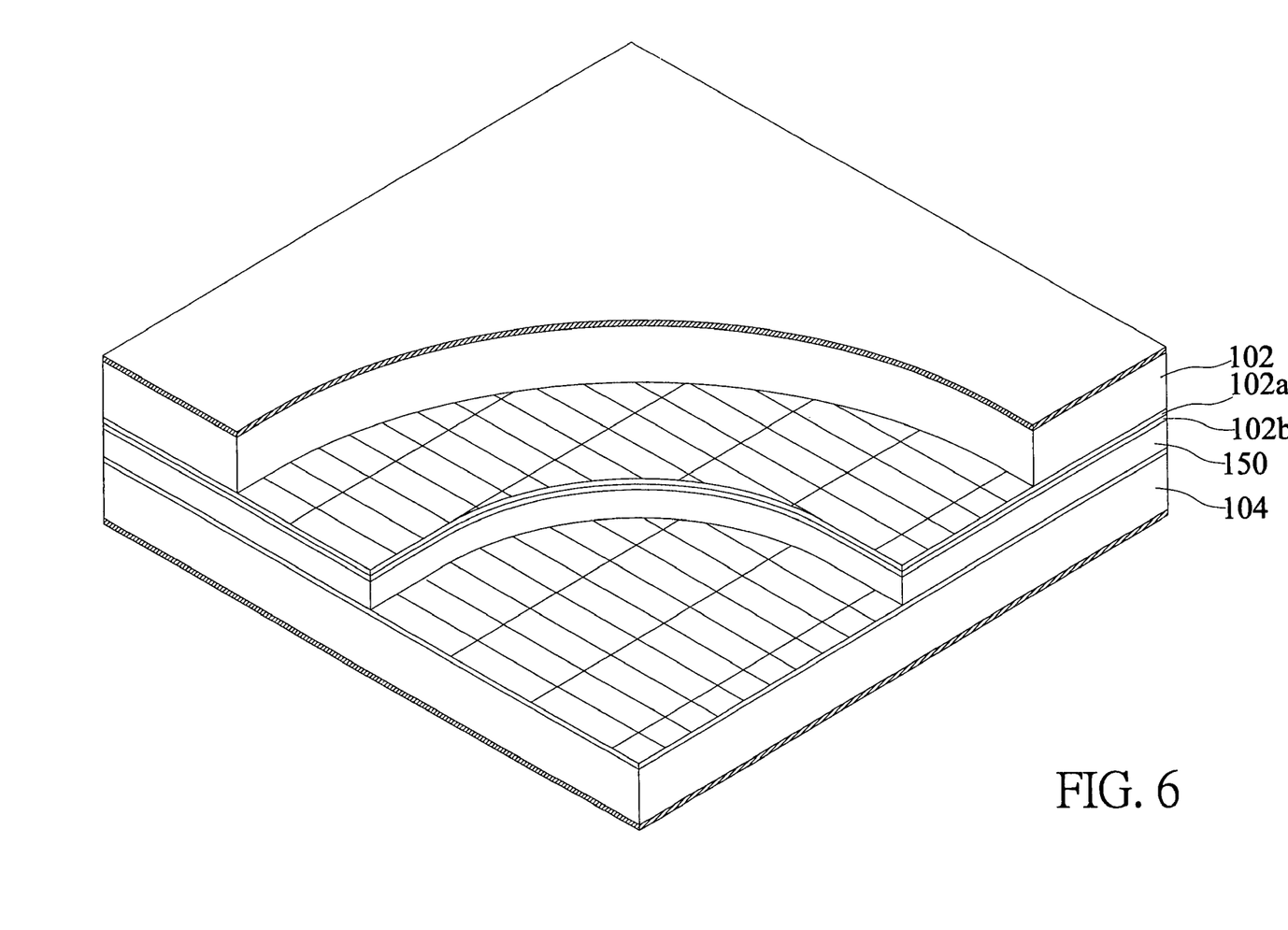
FIG. 6 is a cross sectional view of a portion of a liquid crystal display according to one embodiment of the present disclosure.

The MVA LCD of the present disclosure is preferably a thin film transistor (TFT) LCD with a liquid crystal layer 150 sandwiched between a first substrate 102 and a second substrate 104. As shown in FIG. 6, the first substrate 102 of the present disclosure is referred to as a color filter (CF) substrate because color filters 102a and a common electrode 102b are formed thereon, while the second substrate 104 is referred to as a TFT substrate. Usually, spacers 170 are formed between the substrates for defining a cell gap between the substrates. It should be understood by those skilled in the art that the color filters can be provided on the second substrate together with the TFTs instead of the first substrate.

Figure 1:
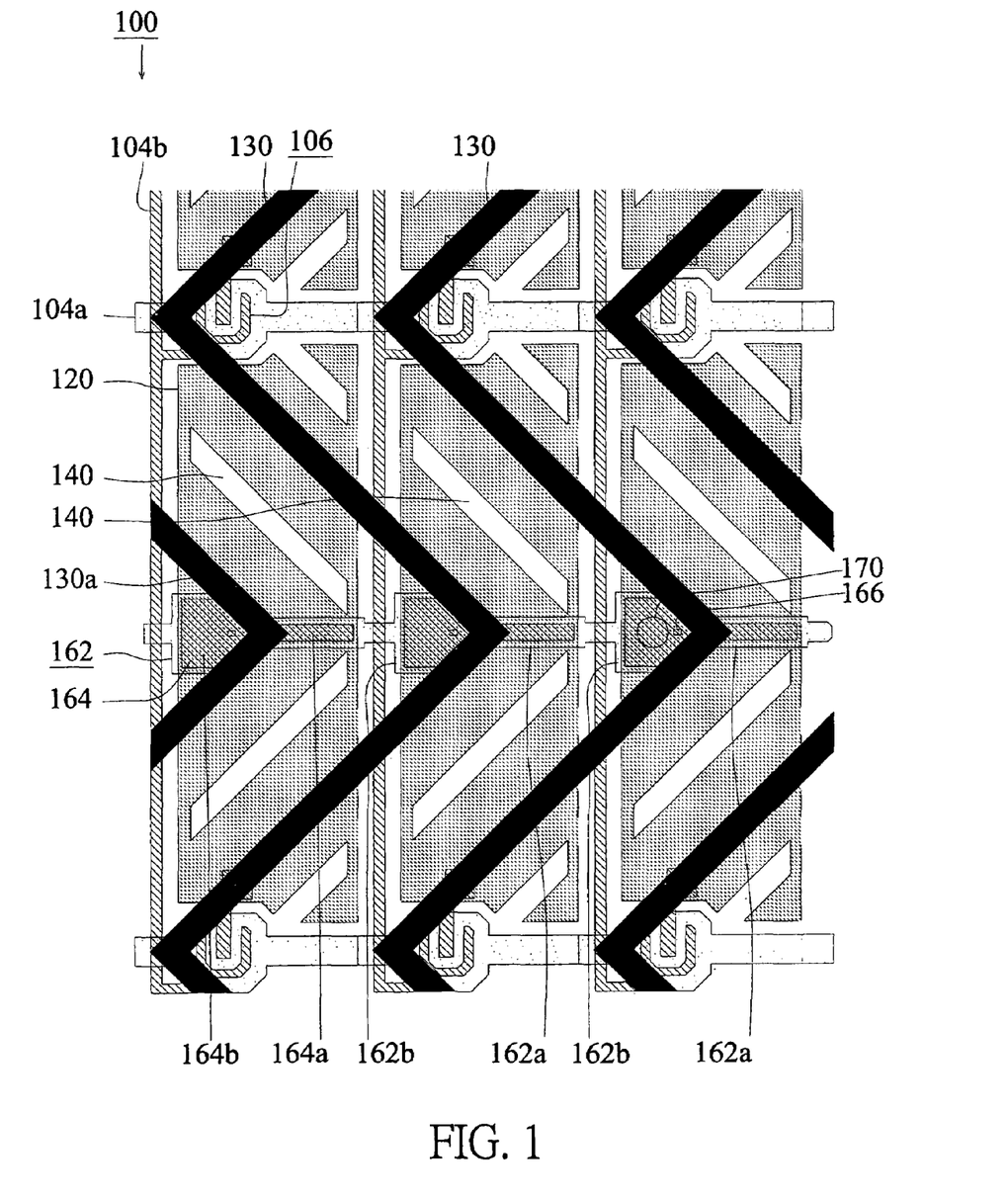
FIG. 1 is a top plan view of a portion of a multi-domain vertically aligned (MVA) LCD according to one embodiment of the present disclosure.

FIG. 1 is a top plan view of a portion of an MVA LCD 100 according to one embodiment of the present disclosure wherein the amorphous semiconductor pattern for forming TFTs is not shown for simplicity. The TFT substrate of the LCD 100 is provided with a plurality of parallel gate lines 104a, a plurality of parallel data lines 104b perpendicular to the gate lines, and a plurality of thin film transistors (TFTs) 106 and pixel electrodes 120 formed like a matrix at the intersections between the gate lines 104a and data lines 104b. The pixel electrodes 120 are disposed in a region that is surrounded by two adjacent gate lines 104a and two adjacent data lines 104b. In this embodiment, the regulating structure mentioned above includes a plurality of protrusions 130 and slits 140. The alignment of liquid crystal molecules in the liquid crystal layer 150 (see FIG. 6) is induced by application of a voltage to include a plurality of mutually different directions thereby greatly increasing the viewing angle the LCD 100. The protrusions 130 are arranged in parallel to one another on the first substrate 102 and bent substantially in a zigzag pattern. The slits 140 are provided on the pixel electrodes 120. As shown in FIG. 1, the protrusions 130 and the slits 140 are arranged alternately. Note that the protrusions 130 also can be replaced by forming a plurality of slits on the common electrode 102b of the first substrate 102.

Figure 2:
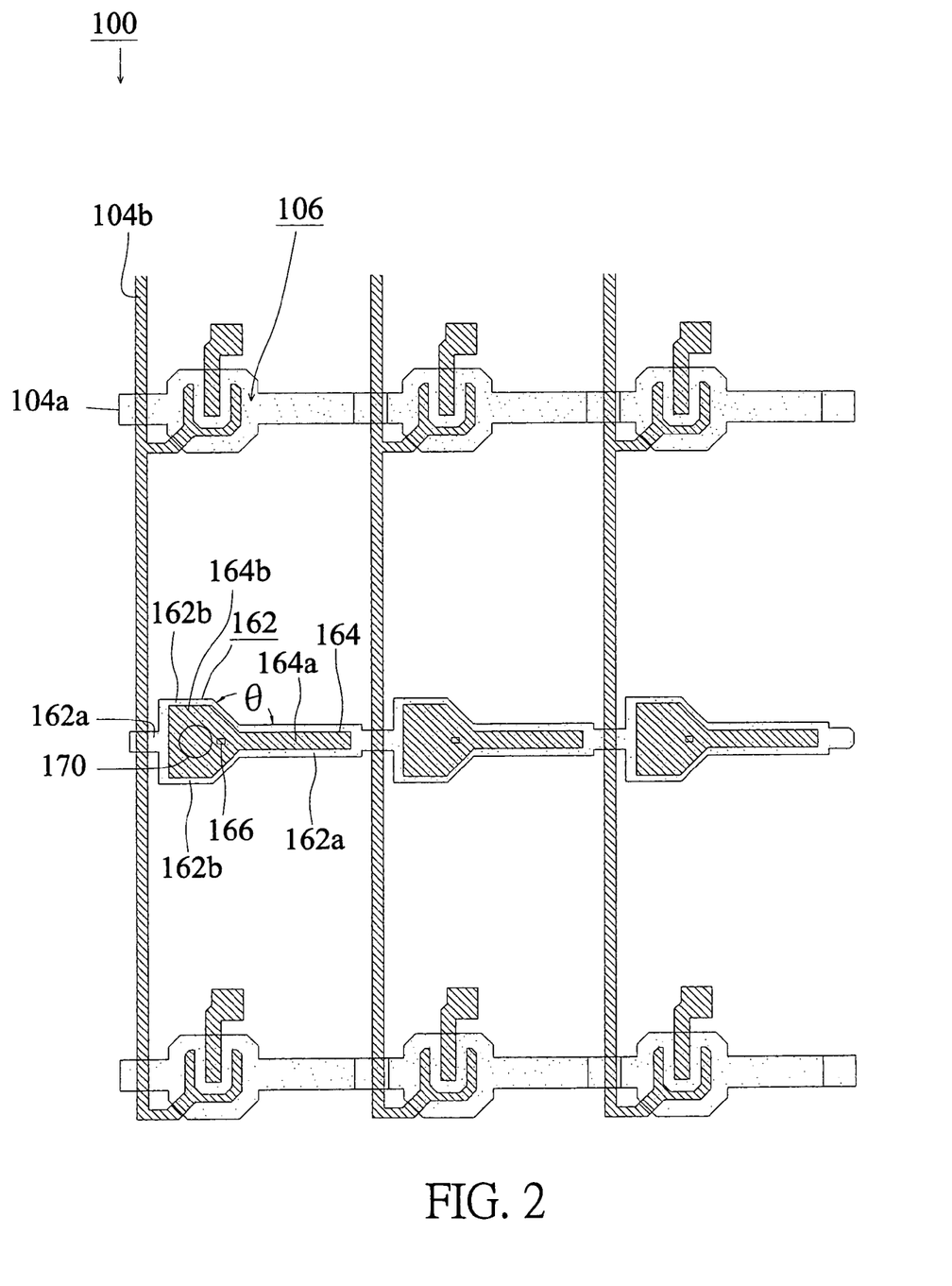
FIG. 2 is a top plan view of the MVA LCD of FIG. 1 wherein the pixel electrodes and the protrusions are not shown for simplicity.

FIG. 2 is a top plan view of a part of the MVA LCD 100 of FIG. 1 wherein the pixel electrodes 120 and the protrusions 130 are not shown for simplicity. In the LCDs of the present disclosure, storage capacitors (Cs) are provided in pixel regions. A gate metal layer is used to form first capacitor electrodes 162, the aforementioned gate lines 104a as well as gate electrodes for TFTs 106, and a data metal layer is used to form second capacitor electrodes 164, the aforementioned data lines 104b as well as source/drain electrodes for TFTs 106. In this embodiment, the capacitor electrodes 162 and 164 respectively have main bodies 162a and 164a extending in a direction parallel to the extending direction of the gate lines 104a and extending portions 162b and 164b extending outwardly from two sides of the main bodies 162a and 164a. The extending direction of the main bodies 162a and 164a is not parallel to the extending direction of the extending portions 162b and 164b. The main bodies 162a of the first capacitor electrode 162 are formed across the pixel regions. The extending portion 162b and 164b of the capacitor electrodes 162 and 164 substantially have a trapezoid contour. The storage capacitor includes an interconnecting portion 166 for electrically coupling the second capacitor electrode 164 to the pixel electrode 120 such that the second capacitor electrode 164 and the pixel electrode 120 together functions as a counter electrode to the first capacitor electrode 162. The interconnecting portion may include a via hole, and the connection through the via hole may be formed by a metal layer, e.g., indium tin oxide (ITO), used to form the pixel electrode 120. The first capacitor electrode 162 and the counter electrode form a storage capacitance unit. The storage capacitance unit's purpose is to maintain voltage at the pixel electrode 120 within specified limits for a predetermined period of time after the TFT has been turned off.

As shown in FIG. 1, in a pixel region defined by two adjacent gate lines 104a and two adjacent data lines 104b, the protrusion 130 has a triangular bending portion 130a. In this embodiment, each of the pixel regions is divided into a plurality of areas by the protrusions 130 and the slits 140, and the area defined between the bending portion 130a of the protrusion 130 and the data line 104b adjacent to the bending portion 130a is darker than other areas in the light transmitting state. Accordingly, in this embodiment, the extending portion 162b of the first capacitor electrode 162 is substantially formed between the bending portion 130a of the protrusion 130 and the data line 104b adjacent to the bending portion 130a. Therefore, embodiments of the present disclosure can greatly increase the overall luminance by the aforementioned storage capacitor design, i.e., decreasing the display area of low luminance (i.e., the area defined between the bending portion 130a and the data line 104b adjacent to the bending portion 130a) and increasing the display area of high luminance (e.g., the area defined between the bending portion 130a and the slit 140 adjacent to the bending portion 130a).

Since the spacers 170 can adversely affect the arrangement of the liquid crystal molecules in the vicinity thereof thereby causing the problem of dark-state light leakage or darkening light-state, the spacers are preferably disposed in the darker area of each pixel region, i.e., the area defined between the bending portion 130a of the protrusion 130 and the data line 104b adjacent to the bending portion 130a. Moreover, the spacers are preferably disposed between the extending portions 162b of the first capacitor electrode 162 and the main body 162a of the first capacitor electrode 162 adjacent to the extending portion 162b, respectively, thereby significantly masking the darkening area due to the spacers 170.

Figure 3:
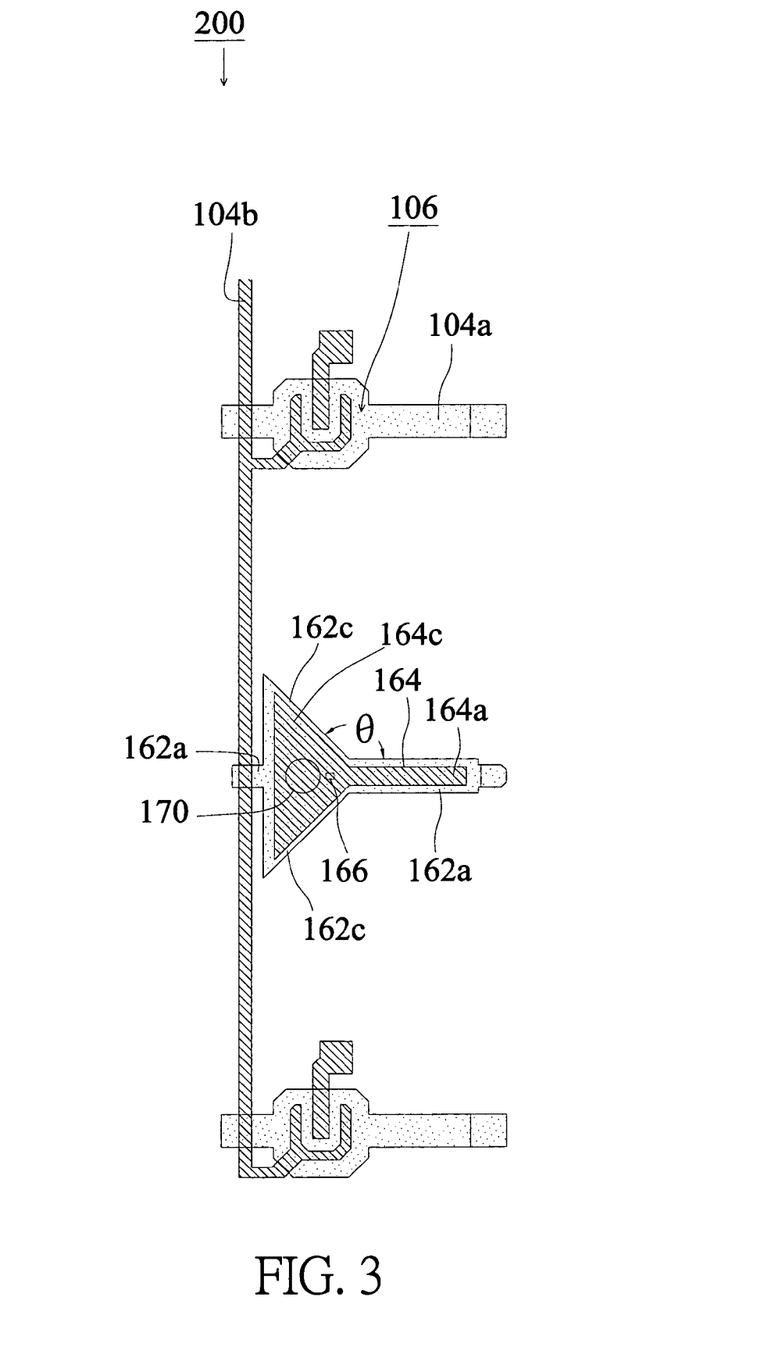
FIG. 3 is a top plan view of a portion of an MVA LCD according to another embodiment of the present disclosure wherein the pixel electrodes and the protrusions are not shown for simplicity.

FIG. 3 is a top plan view of a portion of an MVA LCD 200 according to one embodiment of the present disclosure wherein the pixel electrodes 120 and the protrusions 130 are not shown for simplicity. The LCD 200 is substantially identical to the LCD 100 shown in FIG. 2 with the exceptions that the capacitor electrodes 162 and 164 respectively have triangular extending portions 162c and 164c instead of the trapezoid extending portions 162b and 164b. The extending direction of the main bodies 162a and 164a is not parallel to the extending direction of the extending portions 162c and 164c.

Note that the extending portion 162b or 162c of the first capacitor electrode 162 has at least one edge situated at an angle (denoted as θ in FIG. 2 and FIG. 3) of 135 degrees to the main body 162a of the first capacitor electrode 162. The extending portion 164b or 164c of the second capacitor electrode 164 also has at least one edge situated at an angle of 135 degrees to the main body 164a of the second capacitor electrode 164.

Figure 4:
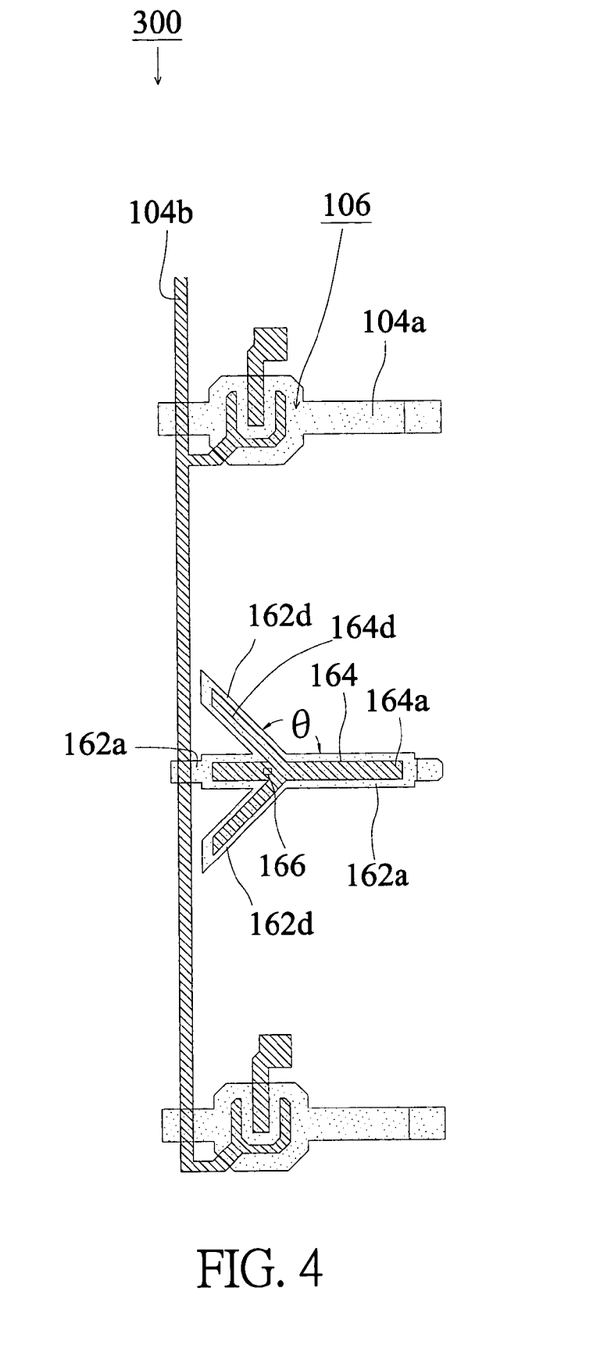
FIG. 4 is a top plan view of a portion of an MVA LCD according to another embodiment of the present disclosure wherein the pixel electrodes and the protrusions are not shown for simplicity.

FIG. 4 is a top plan view of a portion of an MVA LCD 300 according to one embodiment of the present disclosure wherein the pixel electrodes 120 and the protrusions 130 are not shown for simplicity. The LCD 300 is substantially identical to the LCD 100 shown in FIG. 2 with the exceptions that the capacitor electrodes 162 and 164 respectively have a pair of branch-like extending portions 162d and 164d. Note that the angle (denoted as θ in FIG. 4) included between the branch-like extending portions 162d and the main body 162a is 135 degrees. In this embodiment, the angle included between the extending direction of the main bodies 162a and 164a of the capacitor electrodes 162 and 164 and the extending direction of the extending portions 162d and 164d is 135 degrees. The extending direction of the extending portions 162d and 164d is substantially parallel to the extending direction of the regulating structure (e.g., protrusions 130 shown in FIG. 1) adjacent to the extending portions 162d and 164d.

Figure 5:
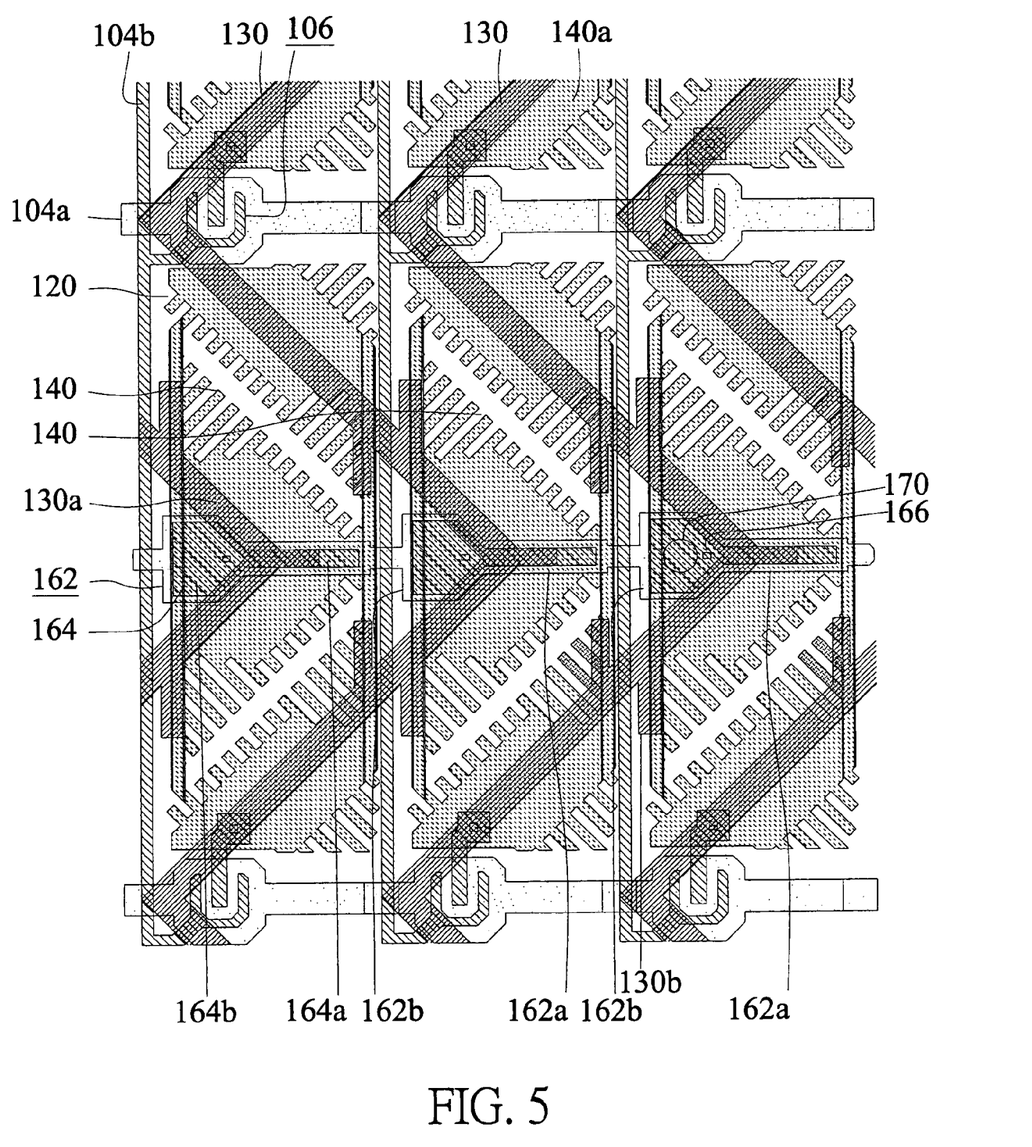
FIG. 5 is a top plan view of a portion of an MVA LCD according to another embodiment of the present disclosure.

FIG. 5 is a top plan view of a portion of an MVA LCD 400 according to one embodiment of the present disclosure. The LCD 400 is substantially identical to the LCD 100 shown in FIG. 1 with the exceptions that the slits 140 formed in the pixel electrode 120 have a plurality of needle-like indentations 140a and the protrusions 130 have branches 130b for decreasing the area occupied by irregularly arranged liquid crystal molecules thereby reducing the area that causes light leakage in the dark-state or darkening in the light-state. Note that, in this embodiment, the storage capacitors can be designed to have contours and arrangements as illustrated in FIG. 3 and FIG. 4, or extending portions of other shapes including, but not limited to, triangle, quadrilateral, pentagon, octagon, polygon, other figures having multiple straight sides, or arc. In addition, although the LCD 400 is illustrated in this embodiment as being provided with the slits 140a and the branches 130b simultaneously, the LCDs according to the present disclosure can be designed to have only the slits 140a or only the branch 130b.

Figure 7:
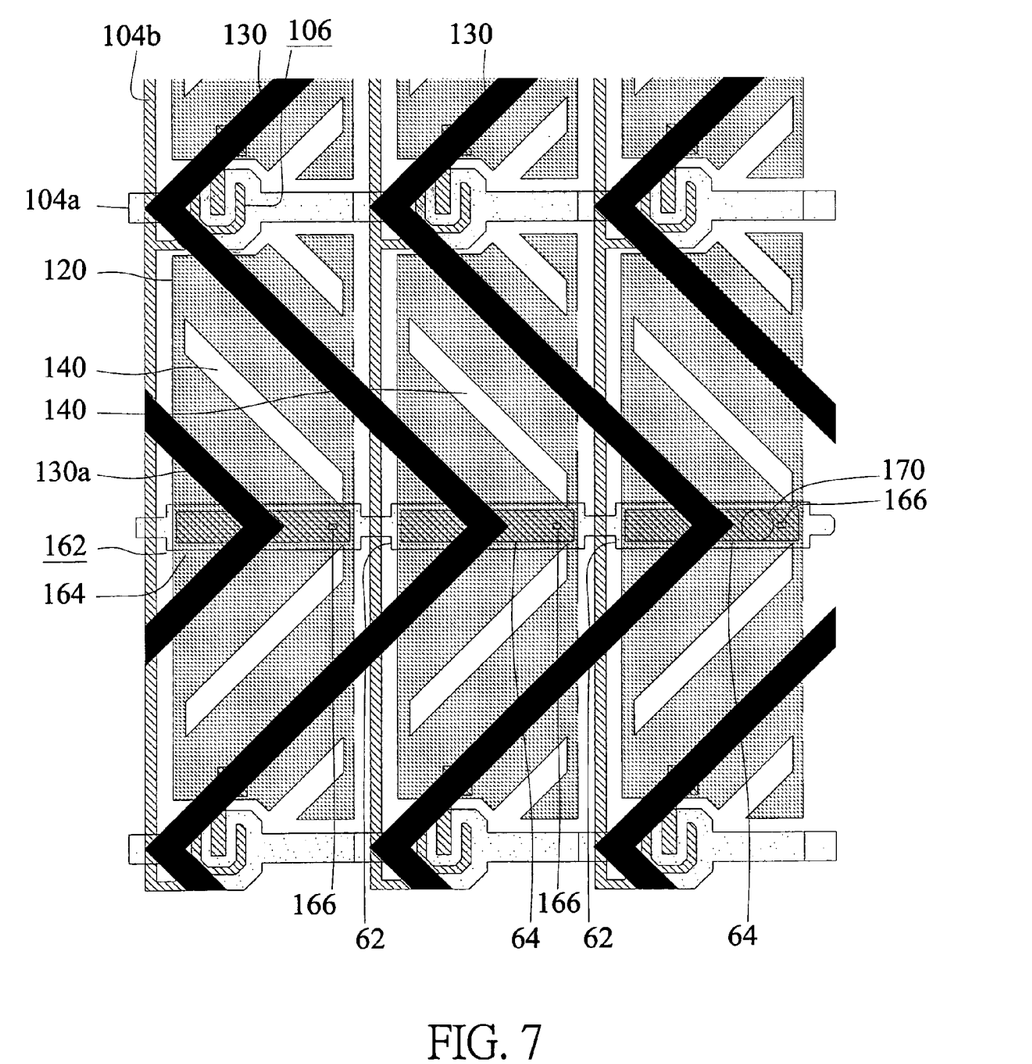
FIG. 7 is a top plan view of a portion of a conventional liquid crystal display.

FIG. 7 is a top plan view of a portion of a conventional LCD provided with a first capacitor electrode 62 and a second capacitor electrode 64. Note that, referring to FIG. 1 and FIG. 7, embodiments of the present disclosure provide a greatly increased overall luminance while realizing a substantially identical storage capacitance (e.g., the overlapping areas between the first capacitor electrode and the second capacitor electrode in FIG. 1 and FIG. 7 are substantially the same) by the aforementioned storage capacitor design, i.e., decreasing the display area of low luminance (due to the providing of the extending portions) and increasing the display area of high luminance (by arranging a portion of the capacitor electrode to the extending portions). Moreover, the present disclosure can be applied to LCDs having a single pixel size of about 100×300 μm, and the observers cannot see the extending portions of the capacitor electrodes. In addition, even if the present disclosure is applied to LCDs having a larger pixel size, e.g., 212×637 μm, the observers still cannot see the extending portions of the capacitor electrodes.

Although the disclosure has been explained in relation to its preferred embodiments, it is to be understood that many other possible modifications and variations can be made without departing from the spirit and scope of the invention as hereinafter claimed.

What is claimed is:

1. A liquid crystal display having a plurality of pixel regions arranged in a matrix, the liquid crystal display comprising:
    a first substrate and a second substrate processed for vertical alignment;
    a liquid crystal layer sandwiched between the first substrate and the second substrate, the liquid crystal layer including liquid crystal molecules aligning in a direction generally perpendicular to a principal surface of the first substrate when no substantial electric field is applied to the liquid crystal layer;
    a regulating structure including a bending portion provided on at least one of the first and second substrates for regulating orientation of the liquid crystal layer such that the liquid crystal molecules are aligned obliquely when a voltage is applied so that the orientation will include a plurality of directions;
    a pixel electrode in each of the pixel regions;
    a first capacitor electrode in each of the pixel regions, the first capacitor electrode having a main body and an extending portion extending outwardly from one side of the main body;
    a second capacitor electrode in each of the pixel regions, the second capacitor electrode having a main body of the second capacitor electrode and an extending portion extending outwardly from one side of the main body of the second capacitor electrode, the extending portion of the second capacitor electrode being formed at a location corresponding to a triangular area of the pixel region defined by the bending portion of the regulating structure and an edge of the pixel electrode adjacent to the bending portion of the regulating structure, wherein the angle included between the regulating structure and the edge of the pixel electrode is less than 90 degrees, and the main body of the second capacitor extends outwardly from the triangular area in a first direction and the extending portion of the second capacitor extends in a second direction not parallel to the first direction;
    an interconnecting portion defining an interconnecting portion area in each of the pixel regions, the interconnecting portion electrically coupling the second capacitor electrode and the pixel electrode such that the second capacitor electrode and the pixel electrode together functions as a counter electrode to the first capacitor electrode; and
    a plurality of spacers for maintaining a cell gap between the first and second substrates, the plurality of spacers being disposed in a disposed spacer region corresponding to the triangular area of the pixel region and mitigating dark-state light leakage, the disposed spacer region is within the triangular area, and
    wherein the disposed spacer region is different from the interconnecting portion area.

2. The liquid crystal display as claimed in claim 1, wherein the first substrate further comprises a common electrode.

3. The liquid crystal display as claimed in claim 1, wherein a darker region of the pixel region in a light transmissive state includes the disposed spacer region.

4. The liquid crystal display as claimed in claim 1, wherein the disposed spacer region is an acute triangular area enclosed by the regulating structure and the edge of the pixel electrode.

5. The liquid crystal display as claimed in claim 1, wherein the interconnecting portion area is within a region defined by the extending portion of the second capacitor electrode and the main body of the second capacitor electrode adjacent to the extending portion.

6. The liquid crystal display as claimed in claim 1, further comprising a plurality of parallel gate lines formed on the second substrate, and a plurality of parallel data lines perpendicular to the gate lines, wherein each of the pixel regions is defined by two adjacent gate lines and two adjacent data lines.

7. The liquid crystal display as claimed in claim 6, wherein the first capacitor electrode and the gate lines are formed from a first metal layer, and the second capacitor electrode and the data lines are formed from a second metal layer.

8. The liquid crystal display as claimed in claim 1, wherein the extending portion of the second capacitor electrode substantially has a triangular contour.

9. The liquid crystal display as claimed in claim 1, wherein the extending portion of the second capacitor electrode substantially has a trapezoid contour.

10. The liquid crystal display as claimed in claim 1, wherein the extending portion of the second capacitor electrode has at least one edge situated at an angle of 135 degrees to the main body of the second capacitor electrode.

11. The liquid crystal display as claimed in claim 1, wherein the extending portion of the second capacitor electrode includes at least one branch.

12. The liquid crystal display as claimed in claim 1, wherein the extending portion of the second capacitor electrode includes two branches each situated at an angle of 135 degrees to the main body of the second capacitor electrode.

13. The liquid crystal display as claimed in claim 1, wherein the regulating structure comprises an array of protrusions provided on the first substrate and an array of slits provided on the pixel electrodes, wherein the protrusions are arranged substantially in a zigzag pattern and in parallel to one another, and the slits and the protrusions are arranged alternately.

14. The liquid crystal display as claimed in claim 13, wherein the protrusions have a plurality of branches.

15. The liquid crystal display as claimed in claim 13, wherein the slits have a plurality of indentations.

16. The liquid crystal display as claimed in claim 13, wherein, in each of the pixel regions, one of the protrusions has a bending portion, and the extending portion of the second capacitor electrode is substantially formed between the bending portion and a data line adjacent to the bending portion.

17. The liquid crystal display as claimed in claim 1, wherein the regulating structure comprises an array of first slits provided on the first substrate and an array of second slits provided on the pixel electrodes, wherein the first slits are arranged substantially in a zigzag pattern and in parallel to one another, and the first slits and the second slits are arranged alternately.

18. The liquid crystal display of claim 1, wherein the spacers and the interconnecting portion are arranged in a line along the main body of the second capacitor electrode.

19. The liquid crystal display of claim 1, wherein the disposed spacer region is closer to a most extended part of the extending portion than the interconnecting portion is to the most extended part of the extending portion.

20. A liquid crystal display having a plurality of pixel regions arranged in a matrix, the liquid crystal display comprising:
    a first substrate and a second substrate;
    a liquid crystal layer sandwiched between the first substrate and the second substrate;

a plurality of gate lines and data lines formed on the second substrate, wherein each of the pixel regions is defined by two adjacent gate lines and two adjacent data lines;

an array of first regulating structures provided on the first substrate;

a pixel electrode on the second substrate, the pixel electrode including an array of second regulating structures wherein the first regulating structures and the second regulating structures are arranged alternately, and each of the pixel regions is divided into a plurality of regions by the first regulating structures and the second regulating structures;

a first capacitor electrode in each of the pixel regions for forming a storage capacitor unit together with the pixel electrode, wherein, in each of the pixel regions, one of the first regulating structures includes a bending portion; and a plurality of spacers for maintaining a cell gap between the first and second substrates, wherein the spacers are disposed at a disposed spacer region, wherein the disposed spacer region is within a triangular area to mitigate dark-state light leakage, the triangular area being defined by the bending portion of the first regulating structure and the data line adjacent to the bending portion of the first regulating structure.

21. The liquid crystal display as claimed in claim 20, wherein the first substrate further comprises a common electrode.

22. The liquid crystal display as claimed in claim 21, wherein the first regulating structures are an array of protrusions structures provided on the common electrode and the second regulating structures are an array of slits arranged substantially in a zigzag pattern.

23. The liquid crystal display as claimed in claim 20, wherein the liquid crystal layer includes a plurality of liquid crystal molecules, and the first and second substrates are processed for vertical alignment such that the direction of the liquid crystal molecules is generally perpendicular to the surfaces of the first substrate and the second substrate.

24. The liquid crystal display as claimed in claim 20, wherein the liquid crystal layer is formed from a liquid crystal material having a negative dielectric constant anisotropy.

25. The liquid crystal display as claimed in claim 20, wherein the data lines are parallel to each other and the pixel electrodes are disposed in the pixel regions.

26. The liquid crystal display as claimed in claim 25, wherein the gate lines are perpendicular to the data lines.

27. The liquid crystal display as claimed in claim 25, further comprising:

a second capacitor electrode in each of the pixel regions; and an interconnecting portion defining an interconnecting portion area in each of the pixel regions, the interconnecting portion electrically coupling the second capacitor electrode and the pixel electrode such that the second capacitor electrode and the pixel electrode together function as a counter electrode to the first capacitor electrode, and wherein the disposed spacer region is different from the interconnecting portion area.

28. The liquid crystal display as claimed in claim 27, wherein the interconnecting portion area is within the region defined by an extending portion of the second capacitor electrode and a main body of the second capacitor electrode adjacent to the extending portion.

29. The liquid crystal display as claimed in claim 27, wherein the first capacitor electrode and the gate lines are formed from a first metal layer, and the second capacitor electrode and the data lines are formed from a second metal layer.

30. The liquid crystal display as claimed in claim 20, wherein the first regulating structures are an array of protrusions being arranged substantially in a zigzag pattern.

31. The liquid crystal display as claimed in claim 30, wherein the protrusions have a plurality of branches.

32. The liquid crystal display as claimed in claim 30, wherein the second regulating structures are an array of slits have a plurality of indentations.

33. The liquid crystal display as claimed in claim 20, wherein the first capacitor electrode having a main body extending in a first direction and an extending portion extending in a second direction different from the first direction, the extending portion of the first capacitor electrode substantially has a triangular contour and the extending portion of the first capacitor electrode is substantially formed within the triangular area.

34. The liquid crystal display as claimed in claim 33, wherein the extending portion of the first capacitor electrode substantially has a trapezoid contour.

35. The liquid crystal display as claimed in claim 33, wherein the extending portion of the first capacitor electrode has at least one edge situated at an angle of 135 degrees to the main body of the first capacitor electrode.

36. The liquid crystal display as claimed in claim 33, wherein the extending portion of the first capacitor electrode includes at least one branch.

37. The liquid crystal display as claimed in claim 33, wherein the extending portion of the first capacitor electrode includes two branches each situated at an angle of 135 degrees to a main body of the second capacitor electrode.

38. The liquid crystal display as claimed in claim 33, wherein the angle included between the first direction and the second direction is 135 degrees.

39. The liquid crystal display as claimed in claim 33, wherein the second direction is parallel to the first regulating structure adjacent to the extending portion of the first capacitor electrode.

* * * * *